(12) United States Patent
Cepuran et al.

(10) Patent No.: US 9,699,587 B2
(45) Date of Patent: Jul. 4, 2017

(54) PROVISIONING AUTOMOTIVE SIM CARDS WITHOUT REMOVAL FROM VEHICLE

(71) Applicant: General Motors LLC, Detroit, MI (US)

(72) Inventors: Lawrence D. Cepuran, Northville, MI (US); Steven Swanson, Commerce Township, MI (US); David George, Farmington Hills, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 852 days.

(21) Appl. No.: 13/782,035

(22) Filed: Mar. 1, 2013

(65) Prior Publication Data

US 2014/0248860 A1 Sep. 4, 2014

(51) Int. Cl.
*H04M 3/24* (2006.01)
*H04W 4/00* (2009.01)

(52) U.S. Cl.
CPC .................. *H04W 4/001* (2013.01)

(58) Field of Classification Search
CPC ... H04W 4/003; H04M 3/387; H04M 15/751; H04M 15/7556; H04M 2215/7209
See application file for complete search history.

(56) References Cited

U.S. PATENT DOCUMENTS

2010/0203864 A1* 8/2010 Howard .................. 455/411
2012/0268235 A1* 10/2012 Farhan et al. .............. 340/3.1

* cited by examiner

*Primary Examiner* — Keith Fang
(74) *Attorney, Agent, or Firm* — Leydig, Voit & Meyer, Ltd.

(57) ABSTRACT

A system and method are provided for re-provisioning a telematics unit of a telematics-equipped vehicle for wireless services. The re-provisioning process includes: connecting a computing device to an on-board diagnostics interface of the telematics-equipped vehicle; accessing a subscriber identification card of the telematics unit via the on-board diagnostics interface; requesting subscription information from a subscriber credentials server via a network connection; receiving the subscription information; and reprogramming the subscriber identification card of the telematics unit for wireless services based on the received subscription information.

20 Claims, 3 Drawing Sheets

PROVISIONING AUTOMOTIVE SIM CARDS WITHOUT REMOVAL FROM VEHICLE

FIELD

The present disclosure relates generally to telematics systems and more particularly to provisioning Subscriber Identity Module (SIM) cards of the telematics system onboard a telematics-equipped vehicle.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

Telematics services often involve the use of a network access device (NAD), such as an embedded cell phone module, which is part of a vehicle communications platform (VCP) of the telematics unit. The VCP may be configured to communicate over various types of networks, such as GSM (Global System for Mobile communications) or LTE (long-term evolution) networks, and may utilize a Subscriber Identity Module (SIM) card or other type of identification card, such as a Universal Integrated Circuit Card (UICC), to provide wireless services via a particular wireless carrier.

However, in conventional systems, changing a wireless carrier for a wireless communication device typically requires providing a customer with a new SIM card. Telematics units and other machine-to-machine (M2M) applications often did not support changing carriers, or would require SIM cards to be mounted in a position where they are physically removable. Automotive telematics units which use embedded SIMs, for example those that are physically soldered to a printed circuit board (PCB) in the VCP or the NAD, would not be able to change carriers except through over-the-air (OTA) re-flashing.

OTA re-flashing comes with its own set of drawbacks. OTA re-flashing requires that the device have a valid account and be in coverage and able to connect to the cellular network, and there are a variety of reasons why a wireless communications device might not be able to perform an OTA re-flashing operation. For example, the device's subscription may have changed and a previous carrier no longer recognizes the device, or errors in the carrier's network remove the device from its database, or the device may be physically located in an area not covered by the carrier.

The above body of information is provided for the convenience of the reader. The foregoing is not an attempt to review or catalog the prior art.

SUMMARY

Implementations of the present invention are described herein, which include a system and method for re-provisioning a telematics unit of a telematics-equipped vehicle for wireless services. The re-provisioning process includes: connecting a computing device to an on-board diagnostics interface of the telematics-equipped vehicle; accessing a subscriber identification card of the telematics unit via the on-board diagnostics interface; requesting subscription information from a subscriber credentials server via a network connection; receiving the subscription information; and reprogramming the subscriber identification card of the telematics unit for wireless services based on the received subscription information.

In a further implementation, the present invention is implemented as computer-executable instructions stored on a tangible, non-transitory computer-readable medium.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used a brief overview is given to guide the reader. In general terms, not intended to limit the claims, systems and methods are described herein for re-provisioning a subscriber identification card of a telematics unit, such as a SIM card or UICC, without requiring physical removal of the card and without requiring an OTA re-flashing session. Implementations of the present invention provide a computer-based re-provisioning tool, such as an application on a personal computer (PC), fir communicating with the VCP of the telematics unit via an on-board diagnostic port of the vehicle, such as an OBD-II port. The re-provisioning tool accesses subscriber credentials information from a server, and uses that information to re-provision the subscriber identification card of the telematics unit via on-board diagnostic port of the vehicle.

Figure 1:
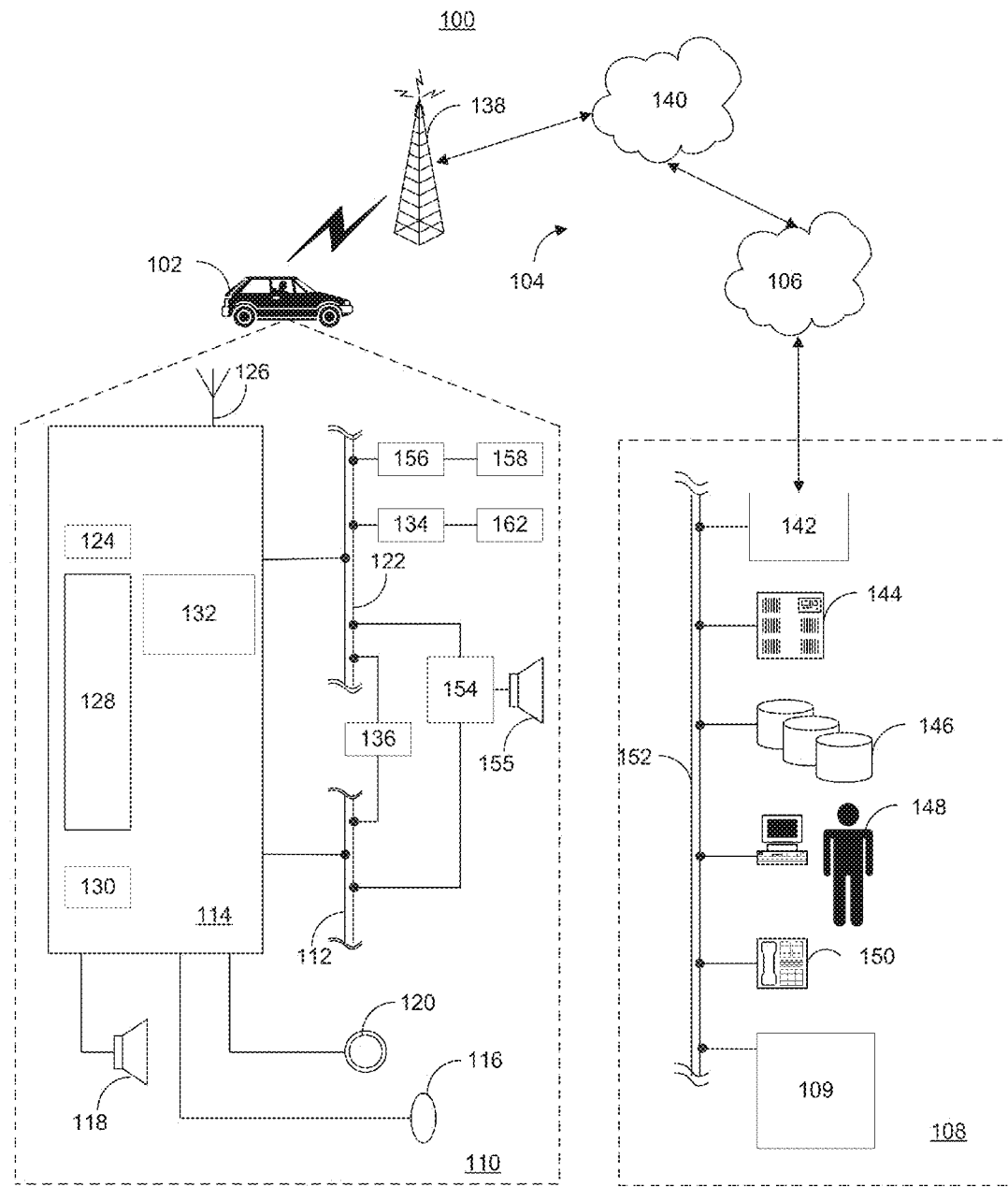
FIG. 1 is an exemplary schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a Global Navigation Satellite System (GNSS) control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
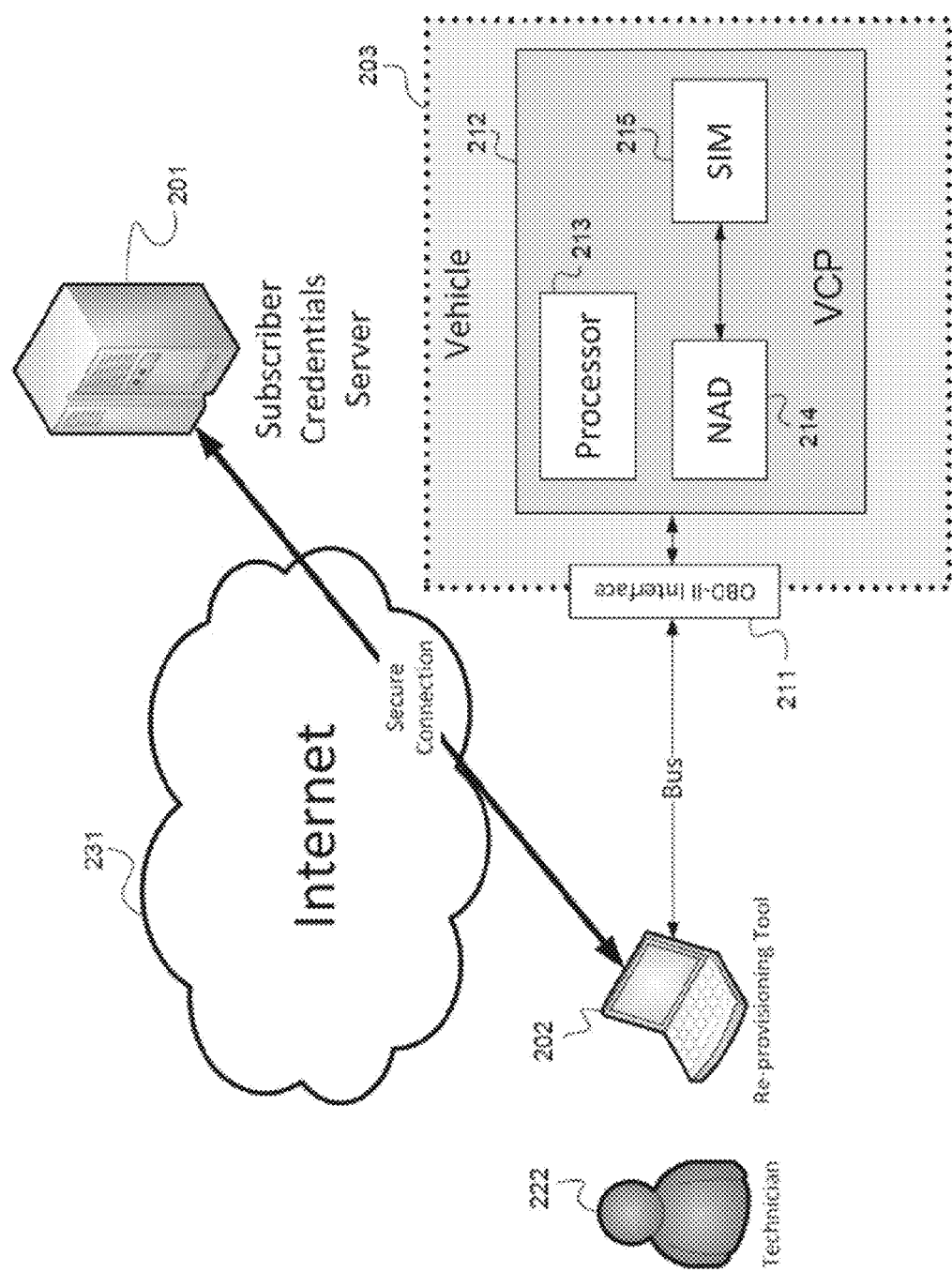
FIG. 2 is an schematic diagram depicting the relationship between a subscriber credentials server, a re-provisioning tool, and a vehicle according to an exemplary implementation.

With further reference to the architecture of FIG. 1, and turning more specifically to FIG. 2, a schematic diagram 200 is provided that depicts a subscriber credentials server 201, a re-provisioning tool on a computing device 202, and certain components of a vehicle 203 in an exemplary implementation of the invention. Vehicle 203 includes an OBD-II Interface 211, which provides upon for connecting the vehicle bus (as described above) with an external device such as a personal computer (PC) Vehicle 203 further includes a Vehicle Communications Platform (VCP) module 212, which is part of the vehicle's telematics unit. The VCP 212 includes at least one processor 213, a network access device (NAD) 214 as described above, and a SIM card 215 (or other type of subscriber identification card) connected to the NAD 214 for enabling wireless communications via a wireless carrier using the NAD 214. The VCP module 212 is connected to the OBD-II Interface 211 via a serial connection and monitors the serial connections for messages, such as CAN or MOST messages, relating to the provisioning of the NAD 214 and SIM card 215.

In the exemplary implementation of the invention, the re-provisioning tool is an application running on a PC 202, which is operated by technician 222. The PC 202 is connected to the OBD-II Interface 211 of the vehicle 203 via a communication bus, and is used to send re-provisioning commands and related information through the OBD-II Interface 211 to the NAD 214 and SIM card 215. These commands and related information are processed by the at least one processor 213 of the VCP module 212, and used to re-provision the NAD 214 and SIM card 215 for wireless communications. The information needed to re-provision the NAD 214 and SIM card 215 for wireless service may be stored on the PC, and it may be obtained by the PC through a network such as the Internet 231 from a subscriber credentials server 201. The PC 202 is preferably connected to the server 201 through a secure connection over the Internet 231, for example, utilizing the HTTPS protocol. It will be appreciated that in other implementations, other types of computing devices, networks, connections, and communication interfaces may be used.

Figure 3:
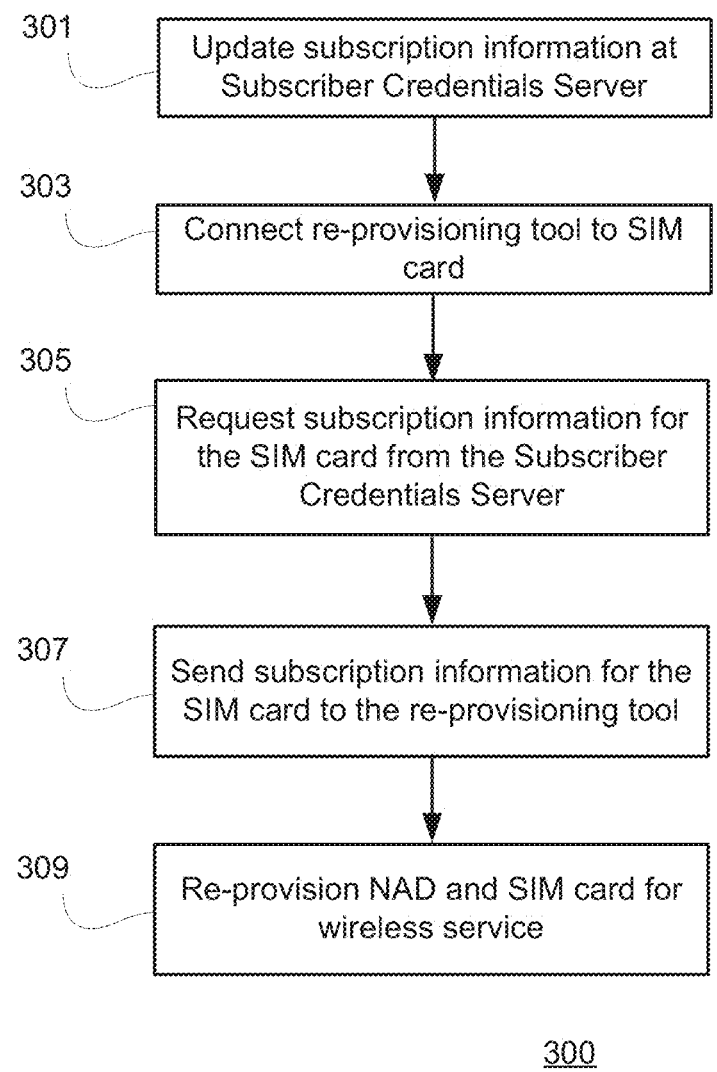
FIG. 3 is an flowchart depicting a process for re-provisioning a subscriber identification card of a telematics unit according to an exemplary implementation.

With further reference to the architectures of FIGS. 1 and 2, and turning more specifically to FIG. 3, an exemplary process 300 for re-provisioning the NAD 214 and SIM card 215 is depicted. When re-provisioning is needed, for example, if a vehicle's telematics unit is to utilize a different wireless carrier, new subscription information is updated at a subscriber credentials server 201, at stage 301. For example, a TSP call center may send new subscription information to the subscriber credentials server 201. The subscription information may include a subscriber profile, an International Mobile Subscriber Identity (IMSI), a Mobile Subscriber Integrated Services Digital Network-Number (MSISDN) (also sometimes referred to as a "Mobile Station international Subscriber Directory Number"), a public land mobile network (PLMN) list, various security keys, and/or other subscription-related information.

At stage 303, computing device 202 is connected to the OBD-II Interface 211 of the vehicle 203, allowing communication between a re-provisioning tool on the computing device 202 with the NAD 214 and SIM card 215 of the vehicle's VCP module 212. At stage 305, the re-provisioning tool utilizes an identifier associated with the SIM card 215 to request subscription information pertaining to the SIM card 215 from the subscriber credentials server 201 via a network, such as the Internet 231.

At stage 307, the subscriber credentials server 201 sends the subscription information pertaining to the SIM card 215 to the computing device 202, and the re-provisioning tool utilizes the subscription information at stage 309 to re-provision the NAD 214 and SIM card 215 for wireless services according to that subscription information by reprogramming the SIM card 215.

It will thus be appreciated that the described system and method allows for re-provisioning of a subscriber identification card onboard a telematics unit, utilizing the on-board diagnostics port of the telematics-equipped vehicle, without removal of the subscriber identification card and without conducting an OTA re-flashing session. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for re-provisioning a telematics unit of a telematics-equipped vehicle for wireless services, the method comprising:
    connecting a computing device to an on-board diagnostics interface of the telematics-equipped vehicle via a communications bus;
    accessing, by the computing device, a subscriber identification card of the telematics unit via the on-board diagnostics interface;
    requesting, by the computing device, subscription information from a subscriber credentials server via a network connection;
    receiving, by the computing device, the subscription information; and
    reprogramming, via the on-board diagnostics interface of the telematics-equipped vehicle, by the computing device, the subscriber identification card of the telematics unit for wireless services based on the received subscription information.

2. The method according to claim 1, wherein the re-provisioning is performed by a re-provisioning tool executed by the computing device.

3. The method according to claim 1, wherein the on-board diagnostics interface is an OBD-II port.

4. The method according to claim 1, wherein the subscriber identification card is a Subscriber Identity Module (SIM) card.

5. The method according to claim 1, wherein the subscriber identification card is a Universal Integrated Circuit Card (UICC).

6. The method according to claim 1, wherein the subscription information includes at least one of a subscriber profile, an International Mobile Subscriber Identity (IMSI), a Mobile Subscriber Integrated Services Digital Network-Number (MSISDN), a public land mobile network (PLMN) list, and a security key.

7. The method according to claim 1, wherein the subscription information is received from the subscriber credentials server over the Internet.

8. The method according to claim 1, wherein re-provisioning the subscriber identification card of the telematics unit for wireless services allows the telematics unit to switch from a first wireless carrier provider's network to a second wireless carrier provider's network.

9. A non-transitory computer-readable medium having computer-executable instructions stored thereon for re-provisioning a telematics unit of a telematics-equipped vehicle for wireless services, the computer-executable instructions, when executed by a processor, causing the following steps to be performed:
    accessing a subscriber identification card of the telematics unit via a communications bus connected to an on-board diagnostics interface of the telematics-equipped vehicle;
    requesting subscription information from a subscriber credentials server via a network connection;
    receiving the subscription information; and
    reprogramming, via the on-board diagnostics interface of the telematics-equipped vehicle, the subscriber identification card of the telematics unit for wireless services based on the received subscription information.

10. The non-transitory computer-readable medium according to claim 9, wherein the computer-executable instructions are part of a re-provisioning tool application.

11. The non-transitory computer-readable medium according to claim 9, wherein the on-board diagnostics interface is an OBD-II port.

12. The non-transitory computer-readable medium according to claim 9, wherein the subscriber identification card is a Subscriber Identity Module (SIM) card.

13. The non-transitory computer-readable medium according to claim 9, wherein the subscriber identification card is a Universal Integrated Circuit Card (UICC).

14. The non-transitory computer-readable medium according to claim 9, wherein the subscription information includes at least one of a subscriber profile, an International Mobile Subscriber Identity (IMSI), a Mobile Subscriber Integrated Services Digital Network-Number (MSISDN), a public land mobile network (PLMN) list, and a security key.

15. The non-transitory computer-readable medium according to claim 9, wherein the subscription information is received from the subscriber credentials server over the Internet.

16. The non-transitory computer-readable medium according to claim 9, wherein re-provisioning the subscriber identification card of the telematics unit for wireless services allows the telematics unit to switch from a first wireless carrier provider's network to a second wireless carrier provider's network.

17. A system for re-provisioning a telematics unit of a telematics-equipped vehicle for wireless services, the system comprising:
 a subscriber credentials server, configured to store subscription information pertaining to a plurality of subscriber identification cards;
 a telematics-equipped vehicle, comprising a network access device (NAD) connected to a subscriber identification card, and further comprising an on-board diagnostics interface; and
 a computing device connected to the on-board diagnostics interface of the telematics-equipped vehicle via a communications bus, configured to execute a re-provisioning tool, the re-provisioning tool being configured to:
  access a subscriber identification card of the telematics unit via the on-board diagnostics interface;
  request and receive subscription information from a subscriber credentials server via a network connection; and
  reprogram, via the on-board diagnostics port of the telematics-equipped vehicle, the subscriber identification card of the telematics unit for wireless services based on the received subscription information.

18. The system according to claim 17, wherein the on-board diagnostics interface is an OBD-II port.

19. The system according to claim 17, wherein the subscriber identification card is a Subscriber Identity Module (SIM) card.

20. The system according to claim 17, wherein the subscription information includes at least one of a subscriber profile, an International Mobile Subscriber Identity (IMSI), a Mobile Subscriber Integrated Services Digital Network-Number (MSISDN), a public land mobile network (PLMN) list, and a security key.

\* \* \* \* \*